United States Patent [19]

Haynie

[11] Patent Number: 4,856,235
[45] Date of Patent: Aug. 15, 1989

[54] METHOD OF MAKING A BI-DIRECTIONAL WEAR SLEEVE

[75] Inventor: Robert N. Haynie, Northville, Mich.

[73] Assignee: Federal-Mogul Corporation, Southfield, Mich.

[21] Appl. No.: 191,753

[22] Filed: May 3, 1988

Related U.S. Application Data

[63] Continuation of Ser. No. 939,246, Dec. 8, 1986, abandoned, which is a continuation of Ser. No. 556,629, Nov. 30, 1983, abandoned.

[51] Int. Cl.[4] ............................................. B24B 5/00
[52] U.S. Cl. ..................................... 51/289 R; 51/290
[58] Field of Search ................... 51/50 R, 48 R, 95 R, 51/95 WH, 103 C, 103 TF, 105 R, 289 R, 290

[56] References Cited

U.S. PATENT DOCUMENTS

| | | | |
|---|---|---|---|
| 1,311,937 | 8/1919 | Williams | 51/290 |
| 1,401,961 | 1/1922 | Coryell | 51/78 |
| 1,472,295 | 10/1923 | Donnelly | 51/290 |
| 1,511,842 | 10/1924 | Schmidt | 51/289 R X |
| 2,033,324 | 3/1936 | Caster et al. | 51/290 |
| 2,108,029 | 2/1938 | Connor | 51/290 |
| 2,115,908 | 5/1938 | Fox | 51/289 |
| 2,224,423 | 12/1940 | Binns | 51/289 R |
| 2,729,919 | 1/1956 | Krafft | 51/92 |
| 2,860,896 | 11/1958 | Naumann | 277/134 |
| 2,869,295 | 1/1959 | Naumann | 51/289 |
| 3,171,189 | 3/1965 | Hedgecock | 29/149.5 |
| 3,214,179 | 10/1965 | Dega | 277/134 |
| 3,302,336 | 2/1967 | Bowman | 51/50 R |
| 3,572,730 | 3/1971 | Otto | 277/96 |

FOREIGN PATENT DOCUMENTS 1058142 3/1964 France .
883188 11/1961 United Kingdom ................. 271/134

OTHER PUBLICATIONS

"An Observation of Some Common Practices in Cylinder Boring, Honing and Wall Finishing", Brush Research Manufacturing Co., Inc. Los Angeles, Calif., Jan. 1981, 51/290.

"Positive Action Seals in Europe" by E. T. Jagger, Transactions of the ASME, Apr. 1968, pp. 424–425, 427–429.

Primary Examiner—Robert P. Olszewski
Attorney, Agent, or Firm—Lawrence J. Shurupoff

[57] ABSTRACT

A method for making A cylindrical surface which is substantially directionally balanced hydrodynamically when rotated in either direction and can be used as a contacting surface in engagement with a radial lip oil seal. The microabrasions produced during preparation of the surface are balanced between clockwise microabrasions and counter-clockwise micro-abrasions.

16 Claims, 4 Drawing Sheets

PRIOR ART

METHOD OF MAKING A BI-DIRECTIONAL WEAR SLEEVE

This application is a continuation of application Ser. No. 939,246, filed Dec. 8, 1986, which is a continuation of application Ser. No. 556,629 filed Nov. 30, 1983, now both abandoned.

This invention relates to method and apparatus for improving the retention of oil in the environment of rotating shafts.

BACKGROUND OF THE INVENTION

For the purposes of discussion it will be assumed that the term "rotating shaft" or just "shaft" includes wear sleeves providing the actual rotating surface in contact with an oil seal, as well as those shafts with which the oil seal makes actual contact.

In spite of the many years and great efforts that have been spent on the arts relating to lubrication, perfect understanding is still unattained. The present invention deals with the relationship between a rotating shaft, a radial-lip type of oil seal, and a housing. The retention of the oil seal in the housing and the assurance of leak-tightness there is not pertinent to the present invention and will be assumed to be present. It is readily obtainable since there is no movement between the installed oil seal case and the housing.

For the retention of oil inside a housing for a rotating shaft, it is common practice to rely on a radial-lip type of oil seal having a casing held in a leak-tight fit with the housing. Such an oil seal has an elastomeric lip for leak-tight engagement with the surface of a relatively rotating shaft. At least three elements are necessary for the retention of oil: (1) the elastomeric ring or shaft seal, (2) the shaft, and (3) the lubricating oil or other fluid which is to be sealed. The lubricating oil provides a very narrow film separating the elastomer from the rotating shaft and thereby preventing the destruction of the elastomer.

Heretofore, it has generally been assumed that a shaft or wear sleeve which has been ground and polished provides an absolutely smooth surface which has nothing to do with the problem of lubricating oil retention unless it is marred by defects such as scratches which are quite visible to the naked eye. It has also been assumed that a shaft which feels smooth and looks smooth is smooth, and that any problem that may arise leading to loss of some of the oil is therefore due to and the fault of the elastomeric sealing element.

The present invention is based upon the discovery that the assumption that a smooth-appearing and smooth-feeling shaft plays no part in the possible leakage of oil is not strictly true. The grinding of the shaft to provide the "smooth" cylindrical surface that is necessary, produces microscopically observable irregularities which have heretofore been largely neglected but which, it has been discovered, can result in oil leakage.

The problem has been that, during grinding, by either the conventional technique of plunge grinding or centerless grinding, the longitudinal axis of both the shaft being ground and the grinder, while they have been assumed to be parallel, have in fact been askew, due to tolerances generally permitted such parallelism. Until only recently (as mentioned below relative to an earlier patent application having Ser. No. 741,533 filed by co-workers on Apr. 26, 1985) the importance of eliminating all such tolerances was not recognized.

This askewness during grinding creates a directionally biased series of non-smooth microabrasions on the shaft, resulting in something analogous to a screw thread, and imparting a liquid-pumping effect with similarities to the effect of an Archimedes' screw. It will be recalled that this screw, whether invented by Archimedes or by others before his time, comprises a rather broad threaded screw encased by a cylinder and was long used in Egypt and elsewhere to raise water. In the present case, the cylinder may be considered as analogous to the radial lip shaft seal, while the screw is provided by the shaft turning within the seal, and the liquid is typically oil. Thus, depending on the direction of shaft rotation, the oil may be pumped away from the lip, or the oil may be pumped in the opposite direction so that the oil flows beyond the seal, producing leakage. In the latter case, the user has usually believed that he has a faulty seal, and he may have changed the seal, only to discover that the problem remained without anybody knowing why.

The ignorance of this problem is such that neither the ultimate users of shafts, nor the shaft manufacturers, nor the oil seal manufacturers have heretofore appreciated it. As a result, when new designs or new types of oil seals were tested, leakage sometimes occurred for no apparent reason that could be determined. On retrospect it appears that the reason was this Archimedes' screw effect due to the directional effect of the grinding of the shaft—even though the shaft seemed to be perfectly smooth and met all the established surface smoothness specifications.

The grinding of a shaft, just discussed, does not result in what is actually a screw thread, but it is similar in that it creates microscopic troughs, all extending in the same general direction, namely, that governed by the degree of askewness, and each individually and collectively tending to give the effect of a screw thread pattern. The angle is so small that it cannot be seen even with a 250× power microscope, but its existence can be verified by a variety of tests. On the other hand, many instances of dynamic oil leakage, i.e., during relative rotation with a shaft, can actually be traced to this basic phenomenon.

A typical example of a shaft intended for use in the automotive or light truck vehicular market is given below in the detailed description of my invention. However, suffice it to say that literally hundreds, if not thousands, of these microscopic troughs on the shaft surface are within the seal lip contact area with the shaft and each imparts an axial force on the thin film of lubricant, commonly oil, generally present between the seal and shaft within this limited area. As a result, the lubricant is literally pumped in one axial direction or the other dependent on relative direction of shaft rotation out from the seal-shaft contact area. In one such direction of shaft rotation, the seal will be considered a "leaker". Although the effect is not gross, the effect over a long period of time, and in some particular environments, will be serious enough that the user of the device will often believe that his oil seal is leaking and will replace it under the faulty assumption that the oil seal is defective or worn out, when that is not the case at all.

The dynamic oil leakage problem may or may not be severe, but the effect on the user, as already noted, may be severe because no one wants to see oil leaking in any of the situations in which oil seals are used, and if the wrong remedy is attempted, considerable expense can result without any beneficial result being obtained.

An earlier patent application having Ser. No. 741,533 conceived by co-workers and subject to the same ownership as this application has been filed on Apr. 26, 1985, which clearly recognizes the problem as being caused by askewness between grinder and shaft, as aforesaid, and proposes as a solution to either (i) eliminate virtually all tolerance heretofore permitted in establishing parallelism between grinder and shaft so as to produce a no-lead shaft or (ii) grind the shaft at a known degree of non-parallelism with the grinder so that the direction of shaft lead could be accurately controlled during production, identified, and taken advantage of during installation, to provide a shaft seal combination which would pump the thin oil film in the direction of the oil reservoir rather than to the air side of the seal. This, however, does not solve the problem that occurs when the shaft is intended to rotate in both directions, such as a transmission drive or drive axle, or where for production reason a compatible direction of shaft rotation can not be assured, and it is to this specific problem that the present invention is directed.

SUMMARY OF THE INVENTION

The present invention in its method aspect relates to the making of a cylindrical surface which is substantially neutral, hydrodynamically speaking, when it is used as the contacting surface in engagement with a radial-lip oil seal during both static and rotational conditions. The invention calls for balancing the directionally biased microabrasions produced during preparation of that cylindrical surface between clockwise inclined microabrasions and counter-clockwise inclined microabrasions. In other words, these directionally biased microabrasions are put into equilibrium by adopting a shaft-surface finishing procedure which assures that approximately the same quality and quantity of directional microabrasions tend toward one direction as tend in the opposite direction. The effect is to cancel the screw-thread effect and hold the oil in status quo. The surface formed is, of course, smooth to the touch and to unmagnified sight.

The balance provided by this invention can be achieved in various ways. It can be done by such expedients as a traverse grind in which the shaft is sent through twice, one time with a left-hand grinder feed and the second time with a right-hand grinder feed. Or the part itself may be sent through the same grinder twice, in these two different directions. Or it may be sent in and then retracted. Other ways of achieving it are by double angle plunge grinding in which the angle of cutting is reciprocated, either "waggling" the wheel or the work piece, or by a combination of the principles of dress, feed, angle, and so on. Each of these will be discussed in detail below, and other objects and advantages will appear from the illustration and description of some preferred embodiments.

Hydrodynamic flutes on a seal and hydrodynamic threads or microabrasions on a shaft are quite different in relationship and physical position with respect to the oil film. The hydrodynamic flutes of a seal are on the "air side" of the seal, so that the flutes are active only when oil gets through the seal to the air side. Shaft microabrasions may be on both sides of the seal, but only the area in contact with the seal can be functional to cause leakage of oil past the seal.

A bi-directional hydrodynamic seal is supposed to keep a seal from net leakage no matter in which direction the shaft is turning, principally by return of oil from the air side to the oil side. On the other hand, a microscopically directionally balanced shaft as described in the present invention, establishes a substantially stable oil film between the seal and the shaft.

DESCRIPTION OF PREFERRED FORMS OF THE INVENTION

Preliminary Considerations

Figures 1, 3:
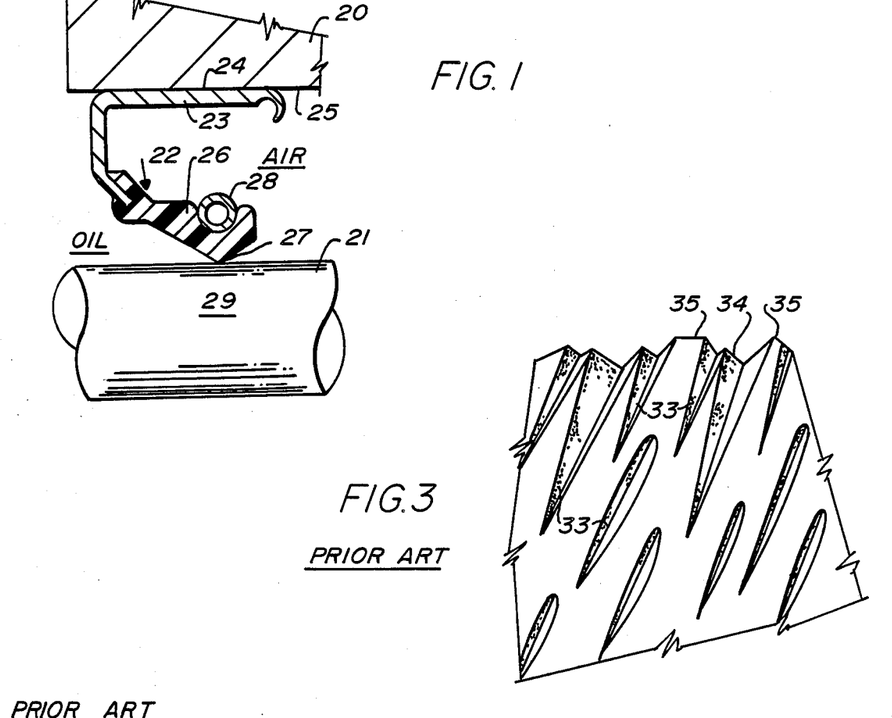
FIG. 1 is a view in elevation and in section of a portion of a typical oil retention system, embodying an oil seal in a housing with its radial lip bearing on the surface of a shaft. Only the upper half of this combination is shown. On the scale shown, the shaft appears perfectly smooth, and the lip appears to be nearly a knife edge, although wear soon blunts that edge. This view represents both the prior art and the present invention, for at this scale they look alike.
FIG. 3 is a greatly enlarged, and possibly somewhat exaggerated, fragmentary view of a portion of the shaft of FIG. 2, showing how the supposedly smooth shaft contains elongated microabrasions with a marked tendency toward screw-thread or directional structure resulting from the way in which the grinding is done.

FIG. 1 shows a simplified and typical oil seal installation. A housing 20 surrounds a shaft 21. Between the shaft 21 and the housing 20 is interposed an oil seal 22 comprising a supporting annular case 23 having an outer periphery 24 engaging a housing bore 25 in a stationary, leak-tight fit. An elastomeric member 26, molded and adhered to the case 23, has a lip area 27 which engages the shaft 21. A garter spring 28 urges the lip 27 against the shaft 21 with a desired amount of pressure. The left hand side of the figure is the air side, and the right hand side is the oil side, where the oil is to be retained. The structure shown in FIG. 1 is merely exemplary, for the principles of the invention apply to a very wide variety of lip-type seals. It will be understood that FIG. 1 shows only substantially the top half and that the bottom half is substantially a mirror image along the axis of rotation.

In FIG. 1 and in actual installations, the shaft 21 appears to have a very smooth, polished surface 29. The shaft 21 may be either a complete shaft, or it may be only a wear sleeve on a shaft, but in either event, its surface appears to be perfectly smooth. However, as a matter of fact, if one were to take a very great enlargement, it would be evident that the shaft 21 is not completely smooth.

Figure 2:
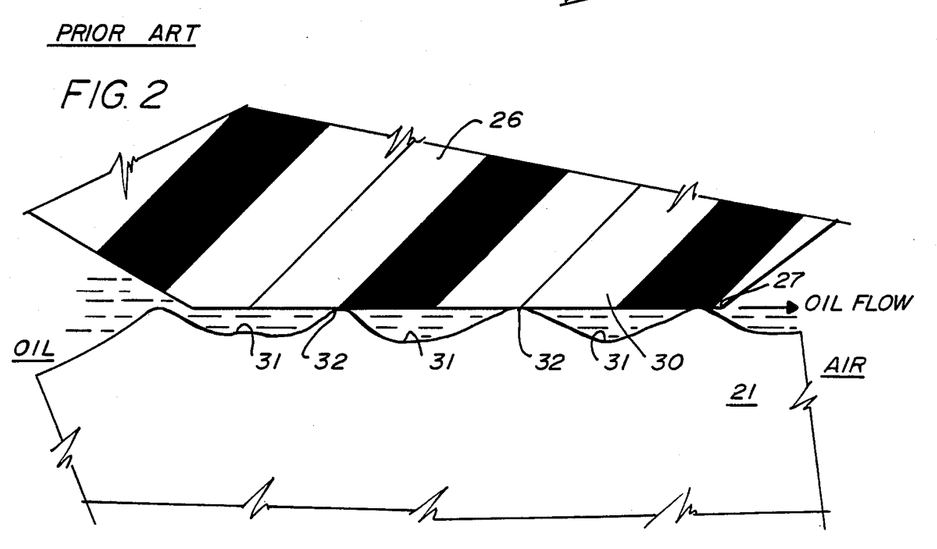
FIG. 2 is a greatly enlarged fragmentary view also in accordance with the prior art, showing the Archimedes' screw effect caused by grinding practices which theoretically are sound enough, but which lead to a directional flow effect.

FIG. 2 shows a great enlargement of a small portion of FIG. 1 as applied to a prior-art shaft or wear sleeve. The lip 27, which in FIG. 1 appeared to be provided with a sharp edge, actually has a flat portion 30 facing the shaft 21, and the shaft 21 is seen not to be smooth at all, but to have troughs 31 between lands 32 and acting substantially like a screw thread. This results from the very slight imperfections which are always found on ground surfaces.

As a shaft (or wear sleeve) is put through a grinder in one direction, or as the grinding device is moved along a stationary shaft, the grinding device, which is, of course, not smooth and must not be completely smooth, includes irregularities. It is supposed to grind the shaft so that the shaft will be very smooth, and to the naked eye it appears to do so, but the smoothness is only relative, and roughness shows up dramatically when one approaches molecular dimensions. In fact, the surface is not smooth even when seen at enlargements substantially above molecular dimensions. The result of this type of imperfection, which has apparently been overlooked or disregarded in the prior art, is that when the shaft 21 rotates in one direction, it will tend to return oil to the oil side, whereas when it rotates in the opposite direction it will tend to carry oil out of the oil side and into the air side, somewhat like an Archimedes' screw. The observer who believes the shaft to be perfectly smooth may well blame this ejection of oil on the oil seal or on something else which is not concerned at all.

FIG. 3 is a very much larger scale enlargement of a very small portion of the prior-art shaft of FIG. 2, showing microabrasions 33 having directional inclination, substantially as are produced by conventional grinding. There are recesses 34 and projections 35, all inclined and tending therefore to act like a screw-thread structure and result in directional flow. This feature (the microabrasion) can be described as the generally parallel, interrupted-helical microabrasions that are generated on a cylindrical surface of a rotating shaft by the interaction of an obliquely rotating, cylindrically-oriented abrasive matrix on the working surface of an abrasive wheel.

The microabrasions 33 often look like elongated four-sided pyramids in relief. The sizes and angles of these pyramids are controlled by (1) the coarseness of the abrasive on the grinding wheel, (2) the strength of the adhesive holding the grinding wheel together, (3) the differential speed between the rotational speed of the shaft and that of the grinding wheel, (4) the angle of skew (if any) between the neutral axis and the grinding axis, and (5) the direction of rotation of the work and grinding wheel. If no care is taken or if the grinding is done in the typical manner, the abrasive action removes material, leaving the pyramids, and also tends to provide a definite direction of Archimedes screw effect, as in FIGS. 2 and 3.

By way of example, an automotive or light truck vehicular application commonly requires a 1.875 inch diameter shaft having a surface finish of 15 RMS. Such a shaft would typically be ground with an 11 inch diameter grinding wheel, which will produce on the shaft pyramids averaging in size from about 0.0003 inch wide, 0.00015 inches deep and 0.015 inch long. Naturally, these dimensions will vary with other shaft diameters, specified surface finishes, and grinding wheel diameters, among other things. Nevertheless the principles involved, specifically the oil film dynamics, remain the same.

Figure 4:
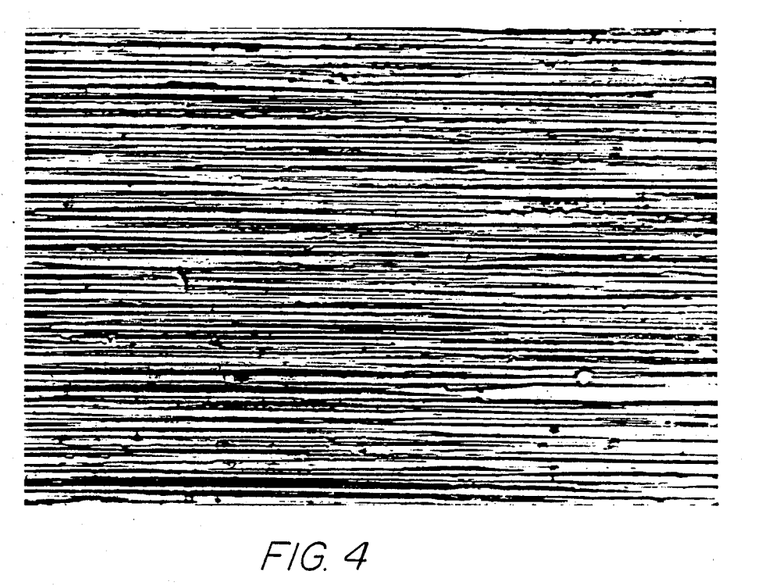
FIG. 4 is a photomicrograph showing a shaft surface as ground pursuant to prior art shown in FIGS. 2 and 3.

The photomicrograph of FIG. 4 was made as follows: A prior-art shaft substantially as described above was coated with collodion. When the collodion hardened, it was stripped from the shaft and light was shined through it. The original picture was taken on color slide film through a microscope. On the 35-millimeter film, the magnification was approximately 50×; from this was made, via an internegative, a 10× enlargement (8"×10" paper, with margin); this was reduced when making the patent drawing; the resultant enlargement is approximately 250× relative to the original. The microabrasions do not appear to have any directional inclinations—but they do, as just described above and as demonstrated both by oil leakage and by sensitive string tests. FIG. 4 shows how it appears to be impossible to ascertain the effects of shaft microabrasions visually even at great magnification.

A substantially neutral hydrodynamically compensating shaft

Figure 5:
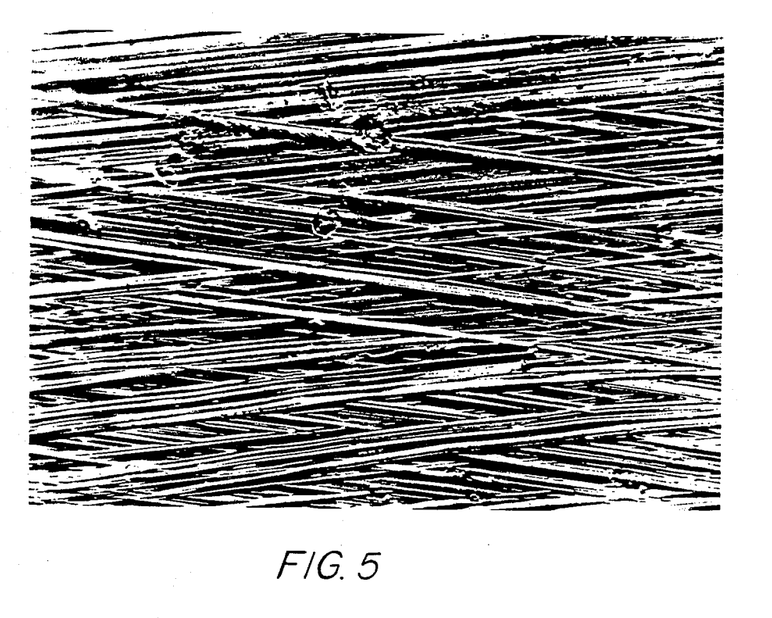
FIG. 5 is a photomicrograph showing an actual shaft surface as ground pursuant to the present invention, but greatly exaggerated as to angle.

By practicing the present invention, a hydrodynamically directionally balanced structure as shown in FIG. 5 can be obtained. Given a 1.875 inch diameter shaft as described above, the seal-shaft contact area will be approximately 0.010 to 0.020 inch wide along the axial direction and within this span literally hundreds of the aforesaid pyramid shaped troughs will be exposed to the thin oil film.

FIG. 5 shows an actual enlargement of a shaft which has been treated according to the present invention and is substantially hydrodynamically microscopically balanced. As shown in FIG. 5, there are a number of pyramid-like microabrasions on the shaft surface. Microabrasions cannot be avoided. The depth of what appear to be scratches range up to about 0.00025 inch deep. Again, these microabrasions are very small, but each one tends to move the oil in a direction depending upon the direction of shaft rotation. The angles of inclination of each relative to a plane perpendicular to the shaft axis is in the order of about 0.005° to 0.30° with most probably averaging less than 0.15°. Likewise many, but not all, of the scratches may cross one another. FIG. 5 shows an actual photomicrograph at 150× magnification of the shaft structure.

The cumulative effect of the micro interrupted-helices is to give the shaft a surface texture.

The FIG. 5 photomicrograph was taken generally like that of FIG. 4 but was taken on black-and-white 35 mm. film. On the film the enlargement is almost exactly 50×, and from the film the 8"×10" print represented a somewhat greater than 10× further enlargement, followed by reduction when the photolithographic reproduction was made for the formal Patent Office drawings. For FIG. 5, a special shaft was subjected to microabrasions at an exaggerated angle of about 15° to a radial plane and this was followed by imposing microabrasions of the same magnitude and same angle in the opposite direction. The shaft was then coated with collodion, and when the solvent evaporated, the collodion was removed and light sent through the collodion, the angle being adjusted to show the microabrasions clearly. The exaggerated angles of the micro-abrasions are for the purpose of showing them clearly, and would not be used in practice, where the angles would, as in FIG. 4, be practically unobservable, even at this magnification.

An analysis of the FIG. 5 photograph of highly magnified shaft portions shows that it takes about 5 microabrasions to equal one cut that is 0.002 inch wide. That means it would take 25 microabrasion side-by-side to span the 0.010 inch width of the static band. If the microabrasions average 0.012 inch in length, that means it would take 490.8 end-to-end to go around the 5.89 inch circumference of a 1.875 inch diameter shaft.

Therefore there would be 490.8 × 25 = 12,271 microabrasions, all acting on the oil seal where it touches the shaft.

If each micro-abrasion is biased or skewed only 0.000001 inch (a millionth of an inch), in one revolution it could move oil axially 0.0005 inch (one-half of a thousandth of an inch). This means that in 20 revolutions, one micro-groove could move the axial equivalent of one static lip width.

One micro-groove does not hold much oil, but with 12,271 of them all working together it is no wonder that a seal will leak several drops a minute when the shaft is running at 5000 r.p.m.

Carrying this thought on a little farther, a skew of a millionth of an inch in a space of twelve thousandths of an inch is the equivalent of one inch in a thousand feet. You can hardly see an inch if it is three football fields away. You can see a telephone cable a block away if it is against a clear blue sky. You can't, however, hold two strings in your hand and detect the angle between them if one goes to each side of the phone cable. This is the "micro-lead" of the interrupted helices that make up the surface texture with which we are concerned. Collectively they cause problems even though individually they fade into insignificance.

The invention broadly

Figure 12:
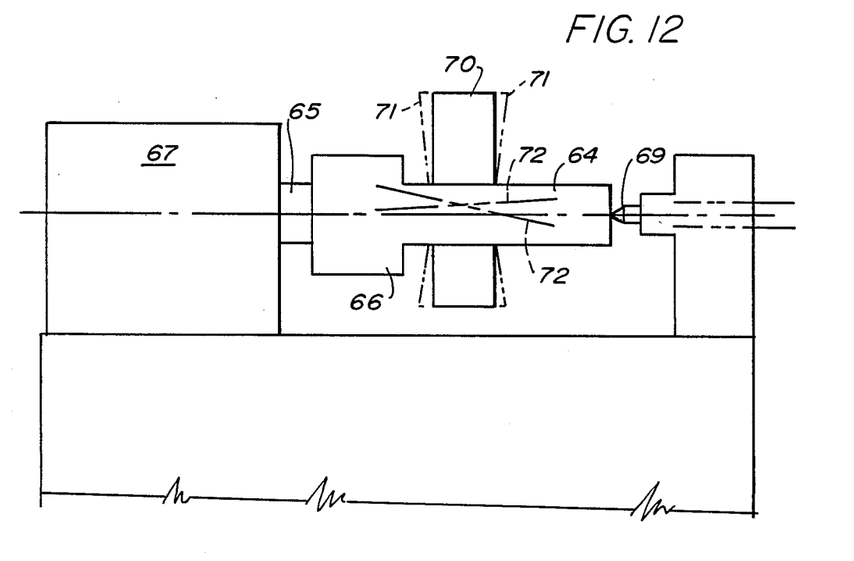
FIG. 12 is a view in side elevation of an on-center grinding operation illustrating application of the present invention, with relative tilting used.

The present invention provides three different approaches to arriving at a more neutral shaft:

1. Produce two sets of microabrasions each being at relatively equal and oppositely inclined angles, relative to the axis of rotation of the shaft, so that the effects are off-setting to the fluid flow (FIGS. 6, 7, and 12).

2. Produce microabrasions by diamond-dress lead that are opposite and off-setting to thread-like microabrasions produced by the normal grinding (see FIGS. 8 and 9).

Figure 10:
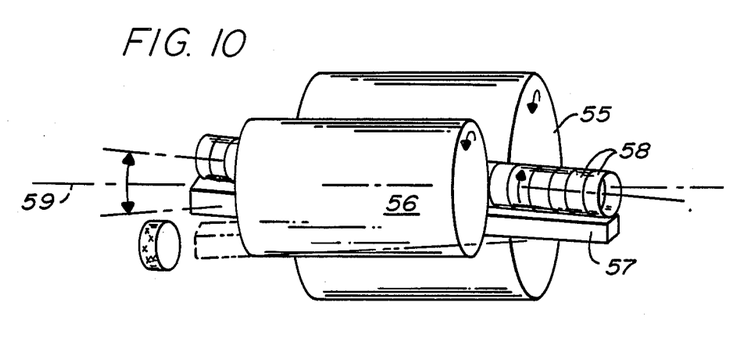
FIG. 10 is a diagrammatic view of a centerless grinding operation in accordance with the present invention, using skewness to balance longitudinal bias.
Figure 11:
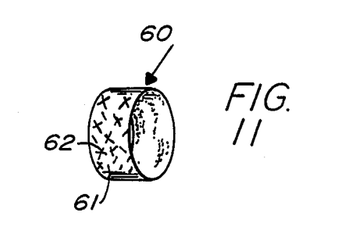
FIG. 11 is a view in perspective of a wear sleeve ground by the system of FIG. 10.

3. Transfer two relatively equal and opposite diamond dress leads to the shaft by grinding (FIGS. 10 and 11).

Figures 6, 7:
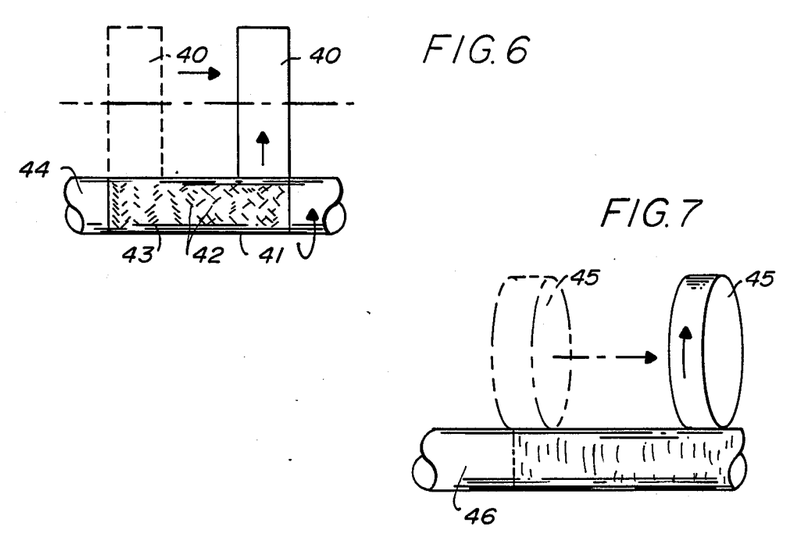
FIG. 6 is a diagrammatic view of a grinding system according to the present invention, employing grinding with relative longitudinal motion between the grinding wheel and the shaft being ground, first in one direction and then in the opposite direction.
FIG. 7 is a diagrammatic view of a modified form grinding system also used to produce equal and opposite angles of microabrasions, balancing skewness of the grinding wheel with its relative longitudinal movement.

Producing microabrasions at angles to the axis of rotation of the shaft, but with equal and opposite angles (FIGS. 6 and 7)

FIG. 6 shows diagrammatically a grinding wheel 40 with circumferential abrasive particles which tends to produce a right-hand effect on a shaft 41 when the shaft 41 and wheel 40 are moved in one direction relative to each other, and a left-hand effect when moved in the opposite direction. There may be two such grinding wheels that are substantially identical, or a single grinding wheel 40 which is moved relative to the shaft 41, first in one direction to produce microabrasions 42 and then in the other to produce microabrasions 43. In both instances the microabrasions 42 are at an angle to the axis 44 of rotation of the shaft, but if properly made with proper velocities, contact, and parallelism, the angles of inclination of the microabrasions 42 and 43 can be made substantially equal and opposite, and an approximately neutral shaft thereby made.

In FIG. 7 a similar effect is obtained by using a grinding wheel 45 which is somewhat skewed relative to a shaft 46 and then moving it in such a direction and at such a rate that instead of producing an effect on the shaft 46 in the nature of a screw thread, or with directional tendencies, tends to produce a neutral series of scratches without inclination.

A similar system might use the skewed wheel 45 in plunge grinders, and then plunge-grinding the same shaft with a different wheel of opposite skew. Another alternate system would be to follow the plunge-grinding with the skewed wheel 45 and then using longitudinal movement with a wheel like the wheel 40 to produce microabrasions in the opposite direction and crossing at about the same angle. Thus, there will be a combination of left-hand and right-hand directional tendencies, which amount to a substantially neutral tendency in the end.

Figure 8:
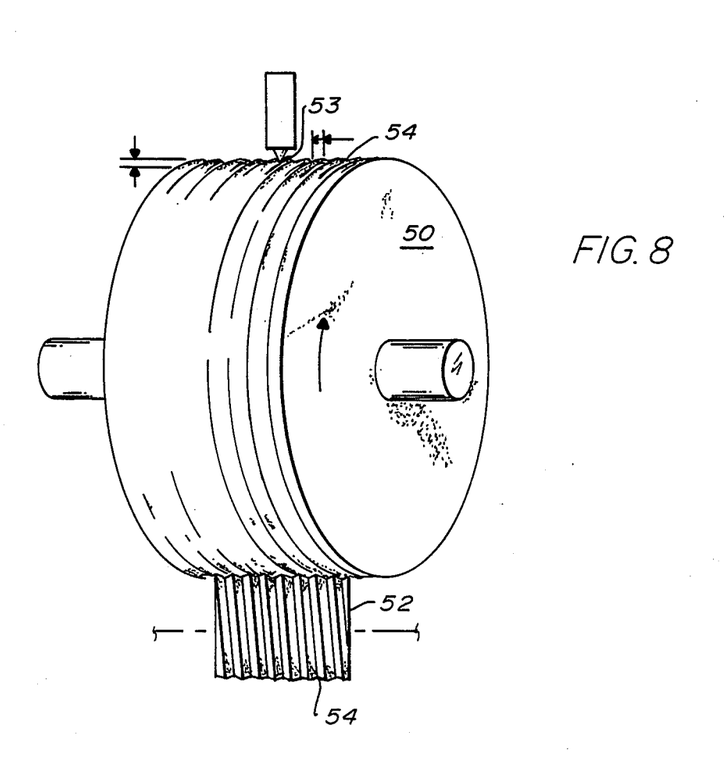
FIG. 8 is a diagrammatic view of a modified form of grinding system balancing dress against longitudinal movement for producing equal and opposite angles in a single one-directional pass.
Figure 9:
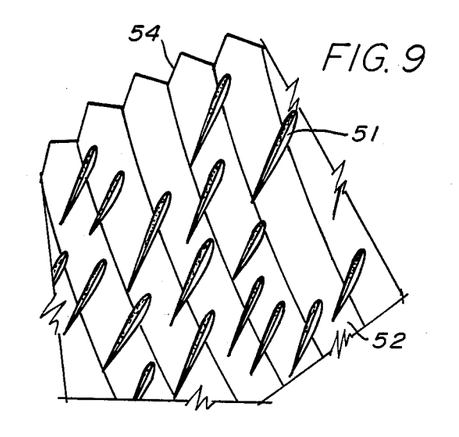
FIG. 9 is an enlargement of a portion of the shaft or wear sleeve after grinding according to FIG. 9.

Adding balancing threads against microabrasions (FIGS. 8 and 9)

FIG. 8 shows an abrasive wheel 50 which has been skewed so that it produces microabrasions 51 in one direction, on a shaft 52 that is moved longitudinally. This grinding wheel 50 is then trimmed, as illustrated in FIG. 8, by a diamond dress device 53, which advances about 0.008 of an inch per revolution of the wheel, thereby producing something like a screw thread 54 on the shaft or wear sleeve 52. This is shown in FIG. 9 where the microabrasions 51 and screw thread 54 are shown enlarged and crossing each other.

The grinding may be plunge grinding, if desired, or longitudinal, if desired. The combination of skewing the abrasive wheel 50 slightly to produce the microabrasions 51 and the threads 54 produced as a result of the diamond dress 53 results in the structure shown in FIG. 9 in which threads 54 are inclined in one direction, and the microabrasions 51 are inclined in the other. By trial and error, or by careful design, the microabrasions may be balanced against the screw thread to assure a substantially neutral action. Thus, a right hand lead from a diamond dressing may result in a thread which would be clockwise in the direction of rotation shown, whereas the abrasion scratches would result in a left hand lead. The scratches 51 are superimposed on the thread 54, which was generated by the diamond dress 53.

A centerless grinding operation (FIGS. 10 and 11)

FIG. 10 shows an operation in which a grinding wheel 55 and a rubber driving wheel 56 are paired with their axes slightly skewed so as to achieve the driving effect. A blade 57 supports a series of rings 58 to be ground into wear sleeves. By having the blade 57 tipped to lie askew relative to the centerline 59 of the grinding wheel 55, the microabrasions below the centerline 59 give a clockwise orientation to the micro-structure, and those above give the opposite orientation. By raising or lowering one end of the support blade 57, the centerline of the rings 58 being ground will cross the centerline 59. The support blade 59 can be adjusted accurately so as to balance the scratches in one direction with those of the other, and thereby produce a wear sleeve 60 like that shown in FIG. 11 with crossing troughs 61, 62.

Thus, raising or lowering one end of the support blade 54 so that the center lines being ground tend to cross, produces something like the thread structure. The centerline of the grinding wheel 55, if raised in the opposite direction, changes the direction of the microabrasion lead. Thus microabrasions below the centerline give a clockwise orientation to the microstructure, and those above the centerline tend to give a counterclockwise orientation. The result when this is done in both directions, again, will produce a substantially hydrodynamically balanced series of rings which later become wear sleeves, and which will prevent the kind of leakage of oil which has been described above.

A centered grinding operation (FIG. 12)

FIG. 12 shows an on-center grinding set up which will produce a structure having the same effect as that shown in FIG. 5, which is substantially hydrodynamically balanced so that the oil will not be worked out from the oil side to the air side no matter which direction the shaft rotates in, and in fact oil that might tend for other causes to leak out can be returned to the oil side of the seal.

In FIG. 12 a work piece 64 is mounted on a drive shaft 65 by a suitable chuck 66 with a suitable driving mechanism 67 to rotate it. The outboard end of the work piece 64 is retained in place by a suitable end support member 69. A grinding wheel 70 is then applied to the surface on one side of the shaft, or wear sleeve 64. Wheel 70 is plunge-ground or moved along the work piece 64. Conventionally, this has been done in only one direction. The traversing of the grinding wheel 70 along the work in either direction produces a ground thread on the work, as demonstrated earlier. However, by traversing in both directions, the thread tends to be broken up, for reversing the rotation also breaks up the thread. Also, wobbling the axis of rotation of the abrasive wheel 70 (as shown in the broken lines 71) or of the work piece 64 (as shown by the broken lines 72) gives microabrasions in both directions which tend to produce a neutral shaft.

Wobbling implies repeatedly changing the axis of rotation, while tipping implies a single change in position which lasts for many revolutions. Thus, the microabrasions may be changed by wobbling or by tipping the grinding wheel either way, or by raising or lowering the end of the workpiece which tips the work in either way. In each instance, there is a movement through the center line of the other part. In contrast, making the axes nonparallel makes the microabrasions have a definite direction. Therefore, by either tipping or controlled wobbling, the result of the present invention can be obtained.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for making a cylindrical surface which is substantially directionally evenly balanced hydrodynamically when rotated in either direction and can be used as a hydrodynamically neutral contacting surface in engagement with a radial lip oil seal, comprising:

balancing a clockwise set of microabrasions produced during preparation of said surface with counterclockwise set of microabrasions, said sets of microabrasions having approximately equal magnitudes and approximately equally opposed inclined directions so as to neutralize hydrodynamic pumping created by relative rotation between said seal and said surface, wherein said balancing comprises grinding said surface by moving a grinding apparatus relative to said surface, first in one direction to form one of said sets of microabrasions and then in an opposite direction to form the other set of microabrasions while keeping speeds and grinding conditions substantially the same.

2. The method of claim 1 wherein said balancing comprises grinding said surface with a very slightly skewed grinder, reversing the longitudinal axis of said surface, and regrinding it with the same very slightly skewed grinder.

3. A method for making a cylindrical surface which is substantially hydrodynamically microscopically evenly balanced when used as the contacting surface in engagement with a radial lip oil seal during both static conditions and rotation in either direction comprising, forming said surface to be smooth to touch and sight, even when magnified to 250 diameters, and with such scratches as are thereon balanced between a set of clockwise scratches and a set of counterclockwise scratches, and said sets of scratches having approximately equal magnitudes and approximately equal opposed inclinations so as to neutralize hydrodynamic pumping during rotation between said seal and said surface.

4. The method of claim 3 comprising grinding said surface in two stages with the relative direction of said surface to the grinding being reversed between stages.

5. The method of claim 3 comprising grinding with a diamond-dress lead to form one of said sets of scratches and then reversing the rotational axis of the surface by 180° between two otherwise substantially identical stages of grinding to form the other of said sets of scratches.

6. The method of claim 3 comprising grinding with a diamond-dress lead to form one of said sets of scratches, and then grinding the surface with a grinding wheel while moving the grinding wheel relatively thereto in the opposite direction from said lead.

7. A method for minimizing oil leakage between a relatively rotating shaft and radial lip oil seal due to shaft treatment in order to produce a shaft surface that appears smooth even under 250× magnification, though necessarily less than absolute smoothness, due to microabrasions tending to impart directional tendencies to oil flow during relative rotation between said shaft and said seal, comprising substantially balancing the number, amplitude and sign of one set of those microabrasions tending to induce oil flow in one of a second set of those microabrasions tending to induce oil flow in the opposite direction during said rotation.

8. The method of claim 7 in which one set is imparted by contact with a slightly skewed second rotating grinding apparatus in contact with said surface with the skewing producing microabrasions induced toward the opposite direction from those produced by the relative longitudinal movement imparting the other said set of microabrasions.

9. The method of claim 7 in which both sets of microabrasions are produced by contacting said surface, while rotating it, with a rotating relatively skewed rotating grinding surface, there being two such contacting stages with the skewing in one stage being substantially equal to and opposite from that in the other stage.

10. The method of claim 7 in which at least one set of said microabrasions is produced by grinding with a grinder having a diamond-dressed lead.

11. The method of claim 10 in which both sets are so produced, with the relative direction of inclination being opposite in the two sets.

12. The method of claim 10 in which the other set is produced by providing thread-like microabrasions by normal grinding.

13. A method for making a cylindrical surface which is substantially directionally evenly balanced hydrodynamically when rotated in either direction and can be used as a contacting surface in engagement with a radial lip oil seal, comprising:

hydrodynamically balancing by hydrodynamically neutralizing the contact surface by forming a plurality of first microabrasions on said contact surface capable of producing a first hydrodynamic pumping action in a first direction during relative rotation between said seal and said surface and by forming a plurality of second microabrasions on said contact surface capable of producing a second hydrodynamic pumping action in a second direction during said relative rotation between said seal and said surface, said second pumping action being approximately equal in magnitude and opposite in direction to said first pumping action such that hydrodynamic pumping along said surface is neutralized.

14. The method of claim 13 wherein said balancing comprises grinding said surface twice with plunge grinders that are slightly skewed in substantially equal amounts in opposite directions.

15. The method of claim 13 in which said balancing includes grinding in two stages, one stage involving plunge grinding at a slightly skewed angle and the other stage involving grinding while moving the surface relatively to a grinder at a lead sufficient to impart microabrasions balancing those incurred during said one stage.

16. The method of claim 13 in which said balancing comprises producing thread-like microabrasions by ordinary grinding and producing microabrasions by diamond-dress lead that are opposite and offsetting to the thread-like microabrasions.

* * * * *

UNITED STATES PATENT AND TRADEMARK OFFICE
CERTIFICATE OF CORRECTION

PATENT NO. : 4,856,235

DATED : August 15, 1989

INVENTOR(S) : Robert N. Haynie

It is certified that error appears in the above-identified patent and that said Letters Patent is hereby corrected as shown below:

Front Page (Abstract), line 1, after "making" "A" should read -- a --.

Column 4, line 46, "9" should read -- 8 --.

Column 10, line 66, claim 7, after "one" insert -- direction during said rotation with the number, amplitude and sign --.

Signed and Sealed this

Seventh Day of May, 1991

Attest:

HARRY F. MANBECK, JR.

Attesting Officer

Commissioner of Patents and Trademarks